(12) United States Patent
Chao et al.

(10) Patent No.: US 12,367,374 B2
(45) Date of Patent: Jul. 22, 2025

(54) HARMONIC DENSELY CONNECTING METHOD OF BLOCK OF CONVOLUTIONAL NEURAL NETWORK MODEL AND SYSTEM THEREOF, AND NON-TRANSITORY TANGIBLE COMPUTER READABLE RECORDING MEDIUM

(71) Applicant: NEUCHIPS CORPORATION, Hsinchu (TW)

(72) Inventors: Ping Chao, Taipei (TW); Chao-Yang Kao, Hsinchu (TW); Youn-Long Lin, Hsinchu County (TW)

(73) Assignee: NEUCHIPS CORPORATION, Hsinchu (TW)

( * ) Notice: Subject to any disclaimer, the term of this patent is extended or adjusted under 35 U.S.C. 154(b) by 771 days.

(21) Appl. No.: 17/659,015

(22) Filed: Apr. 13, 2022

(65) Prior Publication Data

US 2022/0237430 A1 Jul. 28, 2022

Related U.S. Application Data

(63) Continuation-in-part of application No. 16/451,034, filed on Jun. 25, 2019, now abandoned.

(51) Int. Cl.
*G06N 3/04* (2023.01)
*G06V 10/42* (2022.01)
*G06V 10/44* (2022.01)

(52) U.S. Cl.
CPC .............. *G06N 3/04* (2013.01); *G06V 10/421* (2022.01); *G06V 10/454* (2022.01)

(58) Field of Classification Search
CPC ....... G06N 3/04; G06V 10/421; G06V 10/454

USPC .......................................................... 706/27
See application file for complete search history.

(56) References Cited

U.S. PATENT DOCUMENTS 10,089,556 B1\* 10/2018 Xu ........................ G06V 10/806
2019/0130213 A1\* 5/2019 Shazeer ................ G06F 18/213
2019/0392550 A1\* 12/2019 Uchiyama ................. G06T 7/70

OTHER PUBLICATIONS

Iandola, et al., "DenseNet: Implementing Efficient ConvNet Descriptor Pyramids", Technical Report, UC Berkeley, arXiv: 1404.1869v1[cs.CV] Apr. 7, 2014 (Year: 2014).\*

(Continued)

*Primary Examiner* — Tsu-Chang Lee
(74) *Attorney, Agent, or Firm* — CKC & Partners Co., LLC (57) ABSTRACT

A harmonic densely connecting method includes an input step, a plurality of layer operation steps and an output step. The input step is for storing an original input tensor of the block into a memory. Each of the layer operation steps includes a layer-input tensor concatenating step and a convolution operation step. The layer-input tensor concatenating step is for selecting at least one layer-input element tensor of a layer-input set from the memory according to an input connection rule. When a number of the at least one layer-input element tensor is greater than 1, concatenating all of the layer-input element tensors and producing a layer-input tensor. The convolution operation step is for calculating a convolution operation to produce at least one result tensor and then storing the at least one result tensor into the memory. The output step is for outputting a block output.

13 Claims, 7 Drawing Sheets

(56) References Cited

OTHER PUBLICATIONS

Huang, et al., "CondenseNet: Efficient DenseNet using Learned Group Convolutions", Proceedings of the IEEE Conference on Computer Vision and Pattern Recognition (CVPR), 2018, pp. 2752-2761 (Year: 2018).*

Worrall, et al., "Harmonic Networks: Deep Translation and Rotation Equivariance", CVPR'201, p. 5028-5037 (Year: 2017).*

\* cited by examiner

HARMONIC DENSELY CONNECTING METHOD OF BLOCK OF CONVOLUTIONAL NEURAL NETWORK MODEL AND SYSTEM THEREOF, AND NON-TRANSITORY TANGIBLE COMPUTER READABLE RECORDING MEDIUM

RELATED APPLICATIONS

The present application is a Continuation-in-part of U.S. application Ser. No. 16/451,034, filed Jun. 25, 2019, which is herein incorporated by reference.

BACKGROUND

Technical Field

The present disclosure relates to a harmonic densely connecting method of a block of a convolutional neural network model and a system thereof, and a non-transitory tangible computer readable recording medium. More particularly, the present disclosure relates to a harmonic densely connecting method of a block of a convolutional neural network model and a system thereof, and a non-transitory tangible computer readable recording medium which are according to a harmonic densely connected network.

Description of Related Art

A DenseNet can perform better efficiency on parameter and computation, achieving the same accuracy under fewer parameters and fewer computation operations. However, a layer-input of each of the layer operation steps of the DenseNet should concatenate all of pre-layer outputs of the DenseNet. Because a channel width of a layer-input tensor is increased, a computation of a system is increased and a channel width of a layer-output of each of the layer operation steps is increased. Therefore, an access efficiency of the memory is decreased and a power consumption of the system is increased.

Hence, how to reduce the computation of the system and optimize the memory access to reduce the power consumption is a crucial problem.

SUMMARY

According to one aspect of the present disclosure, a harmonic densely connecting method of a block of a convolutional neural network model is applied to a semantic segmentation and includes an input step, a plurality of layer operation steps and an output step. The input step is performed by a Central Processing Unit (CPU) to store an original input tensor of the block of an input image of the semantic segmentation into a memory. Each of the layer operation steps includes a layer-input tensor concatenating step and a convolution operation step. The layer-input tensor concatenating step is performed by the CPU to select at least one layer-input element tensor of a layer-input set from at least one result tensor and the original input tensor in the memory according to an input connection rule. When a number of the at least one layer-input element tensor of the layer-input set is greater than 1, concatenating all of the at least one layer-input element tensors along a channel dimension, and producing a layer-input tensor. The convolution operation step is performed by the CPU to calculate a convolution operation on the layer-input tensor to produce the at least one result tensor, and then store the at least one result tensor into the memory. The output step is performed by the CPU to output a block output of an output image of the semantic segmentation. The block output is a set of at least one block output element tensor, which is selected from the at least one result tensor and the original input tensor in the memory according to an output connection rule. The semantic segmentation is configured to classify the block of the input image into the block output of the output image. The at least one result tensor of each of the layer operation steps is $T_i$. i is an integer which is larger than 0, and $T_0$ is the original input tensor. The input connection rule in the layer-input tensor concatenating step satisfies:

$$TS_j = \{T_{j-2^x} \mid j \bmod 2^x = 0, j \geq 2^x, x \in \mathbb{Z}, x \geq 0\}.$$

Wherein $TS_j$ is the layer-input set in the layer-input tensor concatenating step of a jth layer operation step. x is a non-negative integer, and $T_{j-1}^x$ is the at least one layer-input element tensor. The at least one result tensor in the memory has a channel width, and the channel width of the at least one result tensor satisfies:

$$\text{Channel}(T_i) = k * m^{z_i}.$$

Wherein $\text{Channel}(T_i)$ is the channel width of $T_i$, k is a constant, m is a constant, and $z_i$ is an integer and satisfies:

$$z_i = \max\{x \mid i \bmod 2^x = 0, x \in \mathbb{Z}, x \geq 0\}.$$

According to another aspect of the present disclosure, a system of the harmonic densely connecting method of the block of the convolutional neural network model is applied to semantic segmentation and includes a Central Processing Unit (CPU) and a memory. The CPU performs the harmonic densely connecting method. The memory is electronically connected to the CPU, and stories at least one result tensor and an original input tensor. The harmonic densely connecting method includes an input step, a plurality of layer operation steps and an output step. The input step is performed by the CPU to store the original input tensor of the block of an input image of the semantic segmentation into the memory. Each of the layer operation steps includes a layer-input tensor concatenating step and a convolution operation step. The layer-input tensor concatenating step is performed by the CPU to select at least one layer-input element tensor of a layer-input set from the at least one result tensor and the original input tensor in the memory according to an input connection rule. When a number of the at least one layer-input element tensor of the layer-input set is greater than 1, concatenating all of the layer-input element tensors along a channel dimension, and producing a layer-input tensor. The convolution operation step is performed by the CPU to calculate a convolution operation on the layer-input tensor to produce the at least one result tensor, and then store the at least one result tensor into the memory. The output step is performed by the CPU to output a block output of an output image of the semantic segmentation. The block output is a set of at least one block output element tensor, which is selected from the at least one result tensor and the original input tensor in the memory according to an output connection rule. The semantic segmentation is configured to classify the block of the input image into the block output of the output image. The at least one result tensor of each of the layer operation steps is $T_i$. i is an integer which is larger than 0, and $T_0$ is the original input tensor. The input connection rule in the layer-input tensor concatenating step satisfies:

$$TS_j = \{T_{j-2^x} \mid j \bmod 2^x = 0, j \geq 2^x, x \in \mathbb{Z}, x \geq 0\}.$$

Wherein $TS_j$ is the layer-input set in the layer-input tensor concatenating step of a jth layer operation step. x is a non-negative integer, and $T_{j-2^x}$ is the at least one layer-input element tensor. The at least one result tensor in the memory has a channel width, and the channel width of the at least one result tensor satisfies:

$$\text{Channel}(T_i) = k * m^{z_i}.$$

Wherein $\text{Channel}(T_i)$ is the channel width of $T_i$, k is a constant, m is a constant, and $z_i$ is an integer and satisfies:

$$z_i = \max\{x \mid i \bmod 2^x = 0, x \in \mathbb{Z}, x \geq 0\}.$$

According to further another aspect of the present disclosure, a non-transitory tangible computer readable recording medium storing instructions which when executed by a Central Processing Unit (CPU) configured to perform a harmonic densely connecting method of a block of a convolutional neural network model. The harmonic densely connecting method of the block of the convolutional neural network model includes an input step, a plurality of layer operation steps and an output step. The input step is performed by the CPU to store an original input tensor of the block of an input image of the semantic segmentation into a memory. Each of the layer operation steps includes a layer-input tensor concatenating step and a convolution operation step. The layer-input tensor concatenating step is performed by the CPU to select at least one layer-input element tensor of a layer-input set from at least one result tensor and the original input tensor in the memory according to an input connection rule. When a number of the at least one layer-input element tensor of the layer-input set is greater than 1, concatenating all of the layer-input element tensors along a channel dimension, and producing a layer-input tensor. The convolution operation step is performed by the CPU to calculate a convolution operation on the layer-input tensor to produce the at least one result tensor, and then store the at least one result tensor into the memory. The output step is performed by the CPU to output a block output of an output image of the semantic segmentation. The block output is a set of at least one block output element tensor, which is selected from the at least one result tensor and the original input tensor in the memory according to an output connection rule. The semantic segmentation is configured to classify the block of the input image into the block output of the output image. The at least one result tensor of each of the layer operation steps is $T_i$. i is an integer which is larger than 0, and $T_0$ is the original input tensor. The input connection rule in the layer-input tensor concatenating step satisfies:

$$TS_j = \{T_{j-2^x} \mid j \bmod 2^x = 0, j \geq 2^x, x \in \mathbb{Z}, x \geq 0\}.$$

Wherein $TS_j$ is the layer-input set in the layer-input tensor concatenating step of a jth layer operation step. x is a non-negative integer, and $T_{j-2^x}$ is the at least one layer-input element tensor. The at least one result tensor in the memory has a channel width, and the channel width of the at least one result tensor satisfies:

$$\text{Channel}(T_i) = k * m^{z_i}.$$

Wherein $\text{Channel}(T_i)$ is the channel width of $T_i$, k is a constant, m is a constant, and $z_i$ is an integer and satisfies:

$$z_i = \max\{x \mid i \bmod 2^x = 0, x \in \mathbb{Z}, x \geq 0\}.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
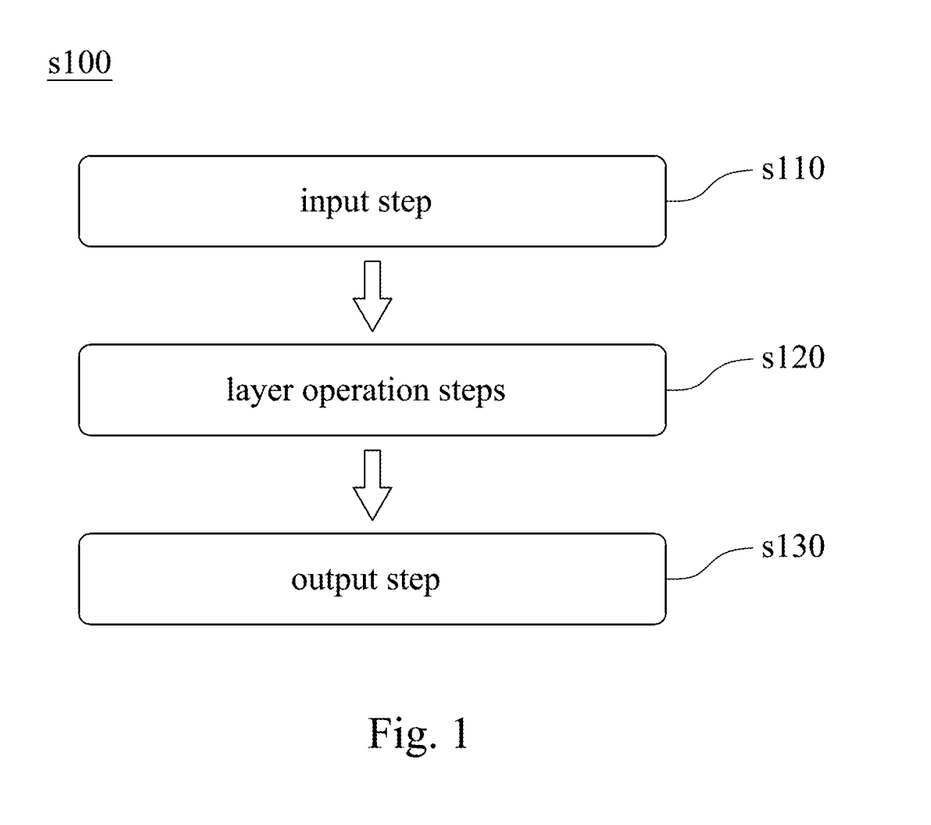
FIG. 1 shows a flow chart of a harmonic densely connecting method of a block of a convolutional neural network model according to one embodiment of the present disclosure.
Figure 2:
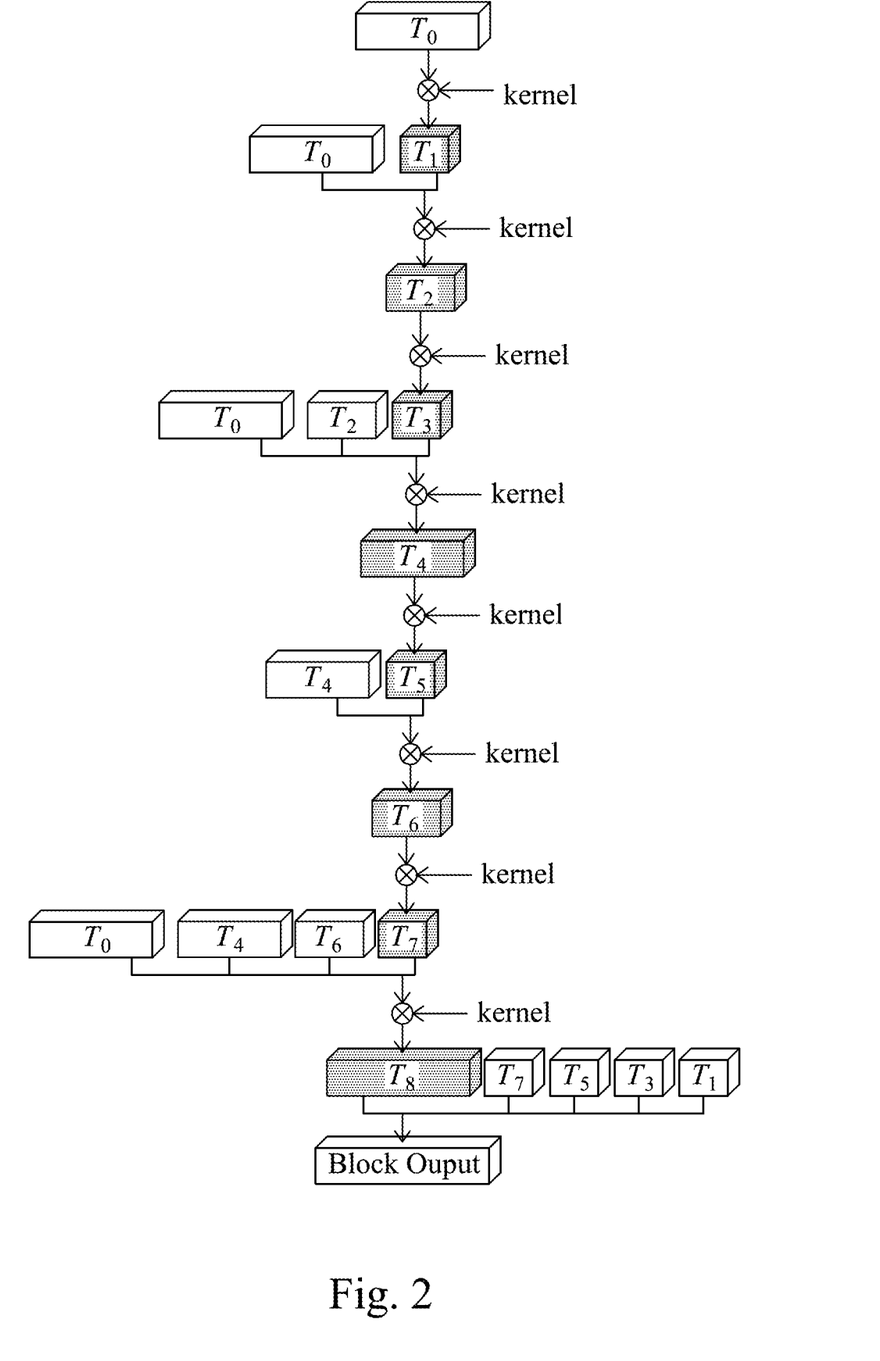
FIG. 2 shows a schematic diagram of one example of the harmonic densely connecting method of FIG. 1.

FIG. 1 shows a flow chart of a harmonic densely connecting method s100 of a block of a convolutional neural network model according to one embodiment of the present disclosure. FIG. 2 shows a schematic diagram of one example of the harmonic densely connecting method s100 of FIG. 1. In FIG. 1 and FIG. 2, the harmonic densely connecting method s100 of the block of the convolutional neural network model includes an input step s110, a plurality of layer operation steps s120 and an output step s130.

Figure 5:
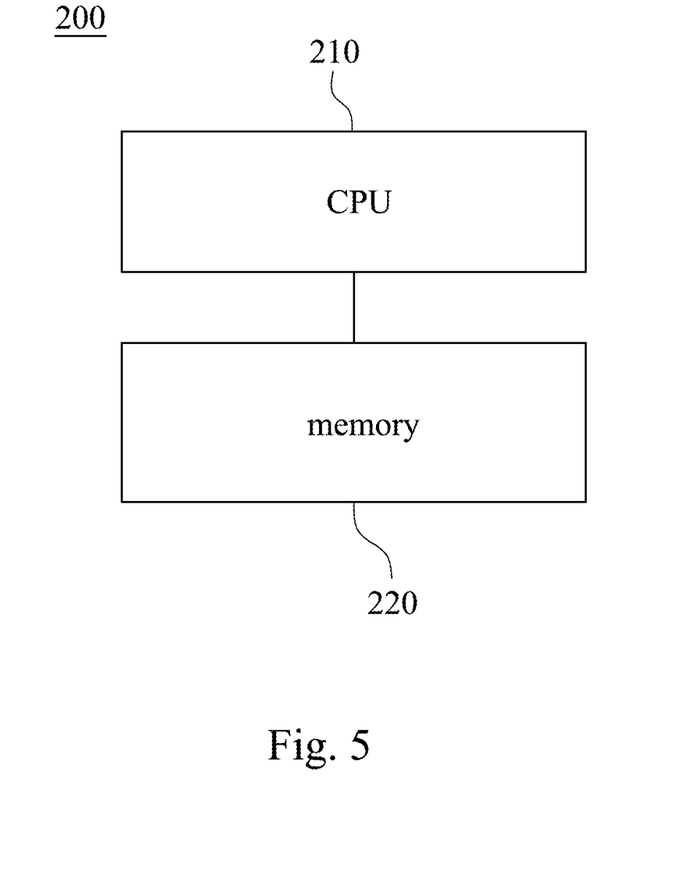
FIG. 5 shows a block diagram of a system of the harmonic densely connecting method of the block of the convolutional neural network model of FIG. 1.

The input step s110 is for storing an original input tensor of the block into a memory 220 (shown in FIG. 5). Each of the layer operation steps s120 includes a layer-input tensor concatenating step and a convolution operation step. The layer-input tensor concatenating step is for selecting at least one layer-input element tensor of a layer-input set from at least one result tensor and the original input tensor in the memory 220 according to an input connection rule. When a number of the at least one layer-input element tensor of the layer-input set is greater than 1, concatenating all of the layer-input element tensors along a channel dimension, and producing a layer-input tensor for a convolution operation in each of the layer operation steps s120. The convolution operation step is for calculating the convolution operation on the layer-input tensor to produce at least one result tensor and then storing the at least one result tensor into the memory 220. A total number of the layer operation steps s120 is N. The output step s130 is for outputting a block output. The block output is a set of at least one block output element tensor, which is selected from the at least one result tensor and the original input tensor in the memory 220 according to an output connection rule. The at least one result tensor of each of the layer operation steps s120 is $T_i$. i is an integer which is larger than 0, and $T_0$ is the original input tensor. The input connection rule in the layer-input tensor concatenating step is satisfied by a formula (1).

$$TS_j = \{T_{j-2^x} \mid j \bmod 2^x = 0, j \geq 2^x, x \in \mathbb{Z}, x \geq 0\}. \quad (1)$$

Wherein $TS_j$ is the layer-input set in the layer-input tensor concatenating step of a jth layer operation step. x is a non-negative integer. $T_{j-2^x}$ is the at least one layer-input element tensor. Because of the input connection rule, a number of the at least one layer-input element tensor is very limited. Therefore, a connection complexity of the harmonic densely connecting method s100 can be reduced comparing to a full-densely connected network. The at least one result tensor in the memory 220 has a channel width, and the channel width of the at least one result tensor is satisfied by a formula (2).

$$\text{Channel}(T_i) = k * m^{z_i}. \quad (2)$$

Wherein $\text{Channel}(T_i)$ is the channel width of $T_i$. k is a constant. m is a constant, and $z_i$ is an integer and satisfied by a formula (3).

$$z_i = \max\{x \mid i \bmod 2^x = 0, x \in \mathbb{Z}, x \geq 0\}. \quad (3)$$

In each of the layer operation steps s120, the input connection rule is for reducing the connection complexity to be constrained in O(log N), wherein O is a big O notation, while a shortcut depth from any layer to the base layer is also in O(log N). In other words, the shortcut depth from any layer operation step to the layer operation step 1 is also in O(log N). Thus, the input connection rule achieves a best balance between the shortcut depth and the connection complexity. Because of the connection complexity is reduced, accesses to the at least one layer-input element tensor of the layer-input set which is a part of the at least one result tensor and the original input tensor in the memory 220 is reduced correspondingly, so that the harmonic densely connecting method s100 can improve a performance and a power-efficiency of the system 200.

In FIG. 2, each of the layer operation steps s120 calculates the convolution operation on the layer-input tensor with the convolutional kernel of each of the layer operation steps s120 so as to produce the at least one result tensor of each of the layer operation steps s120.

Please refer to FIG. 2 and Table 1, Table 1 lists the layer-input set and the at least one result tensor of the layer operation steps s120. The input step s110 is for storing the original input tensor of the block into a memory 220 (e.g., Dynamic Random Access Memory (DRAM) with a local memory for temporary buffering), as shown in FIG. 5, so as to perform the layer operation steps s120. In FIG. 2, the total number of the layer operation steps s120 is equal to 8, and it denotes N=8. In the layer operation step 1, the layer-input set of the layer operation step 1 is selected from the original input tensor in the memory 220 according to the input connection rule. It denotes $TS_j = TS_1 = \{T_{1-2^x} \mid 1 \bmod 2^x = 0, 1 \geq 2^x, x \in \mathbb{Z}, x \geq 0\} = \{T_0\}$, and x={0}. The at least one layer-input element tensor of the layer-input set of the layer operation step 1 is $T_0$. Because a number of the at least one layer-input element tensor of the layer-input set of the layer operation step 1 is equal to 1, the layer-input tensor of the layer operation step 1 is $T_0$. The convolution operation step of the layer operation step 1 performs a convolution operation on $T_0$ and a convolutional kernel of the layer operation step 1 so as to produce $T_1$, and then stores $T_1$ into the memory 220. Further, the channel width of $T_1$ is Channel$(T_1) = k*m^{z_1} = k$, wherein $z_1 = \max\{x \mid 1 \bmod 2^x = 0, x \in \mathbb{Z}, x \geq 0\} = 0$. m is greater than 1.4 and less than 2.

TABLE 1

| layer operation steps | layer-input set | result tensor | channel width of the result tensor |
|---|---|---|---|
| layer operation step | $T_0$ | $T_1$ | k |
| layer operation step | $T_0$, $T_1$ | $T_2$ | k × m |
| layer operation step | $T_2$ | $T_3$ | k |
| layer operation step | $T_0$, $T_2$, $T_3$ | $T_4$ | k × m² |
| layer operation step | $T_4$ | $T_5$ | k |
| layer operation step | $T_4$, $T_5$ | $T_6$ | k × m |
| layer operation step | $T_6$ | $T_7$ | k |
| layer operation step | $T_0$, $T_4$, $T_6$, $T_7$ | $T_8$ | k × m³ |

In the layer operation step 2, a layer-input set of the layer operation step 2 is selected from the at least one result tensor and the original input tensor in the memory 220 according to the input connection rule. It denotes $TS_j = TS_2 = \{T_{2-2^x} \mid 2 \bmod 2^x = 0, 2 \geq 2^x, x \in \mathbb{Z}, x \geq 0\} = \{T_0, T_1\}$, and x is equal to {0, 1}. The at least one layer-input element tensor of the layer operation step 2 is $T_0$ and $T_1$. Because a number of the at least one layer-input element tensor of the layer operation step 2 is greater than 1 and respective to $T_0$ and $T_1$, the layer operation step 2 concatenates $T_0$ and $T_1$ along the channel dimension so as to produce a layer-input tensor of the layer operation step 2. A convolution operation step of the layer operation step 2 performs a convolution operation on the layer-input tensor and a convolutional kernel of the layer operation step 2 so as to produce $T_2$, and then stores $T_2$ into the memory 220. Further, $z_2 = \max\{x \mid 2 \bmod 2^x = 0, x \in \mathbb{Z}, x \geq 0\} = 1$ because x is equal to {0, 1}. Therefore, the channel width of $T_2$ is Channel$(T_2) = k*m^{z_2} = k \times m$.

In the layer operation step 3, a layer-input set of the layer operation step 3 is selected from at least one result tensor and the original input tensor in the memory 220, according to the input connection rule. It denotes $TS_1 = TS_3 = \{T_{3-2^x} \mid 3 \bmod 2^x = 0, 3 \geq 2^x, x \in \mathbb{Z}, x \geq 0\} = \{T_2\}$, and x={0}. The at least one layer-input element tensor of the layer operation step 3 is $T_2$. Because a number of the at least one layer-input element tensor of the layer operation step 3 is equal to 1, the layer-input tensor of the layer operation step 3 is $T_2$. The convolution operation step of the layer operation step 3 performs a convolution operation on $T_2$ and a convolutional kernel of the layer operation step 3 so as to produce $T_3$, and then stores $T_3$ into the memory 220. Further, $z_3 = \max\{x | 3 \mod 2^x = 0, x \in \mathbb{Z}, x \geq 0\} = 0$ because x is equal to $\{0\}$. Therefore, the channel width of $T_3$ is $Channel(T_3) = k*m^{z_3} = k$. The layer-input tensor concatenating step and the convolution operation step of each of the layer operation steps 4-8 are same as above, and will not be described again herein.

The output step s130 of the harmonic densely connecting method s100 selects the set of the at least one block output element tensor from the at least one result tensor in the memory 220 according to the output connection rule. The output connection rule of the output step s130 is satisfied by a formula (4).

$$OS = \{T_q \,|\, q \mod 2 = 1 \text{ or } q = N\}. \quad (4)$$

Wherein OS is the block output. $T_q$ is the block output element tensor of the block output. q is an integer from 1 to N. N is a total number of the layer operation steps, and N is a positive integer. In FIG. 2, the block output is selected from the at least one result tensor and the original input tensor in the memory 220 by the formula (4), and it denotes $OS = \{T_q | q \mod 2 = 1 \text{ or } q = N\} = \{T_1, T_3, T_5, T_7, T_8\}$. Therefore, the block output of the harmonic densely connecting method s100 of FIG. 2 includes $\{T_1, T_3, T_5, T_7, T_8\}$.

Figure 3:
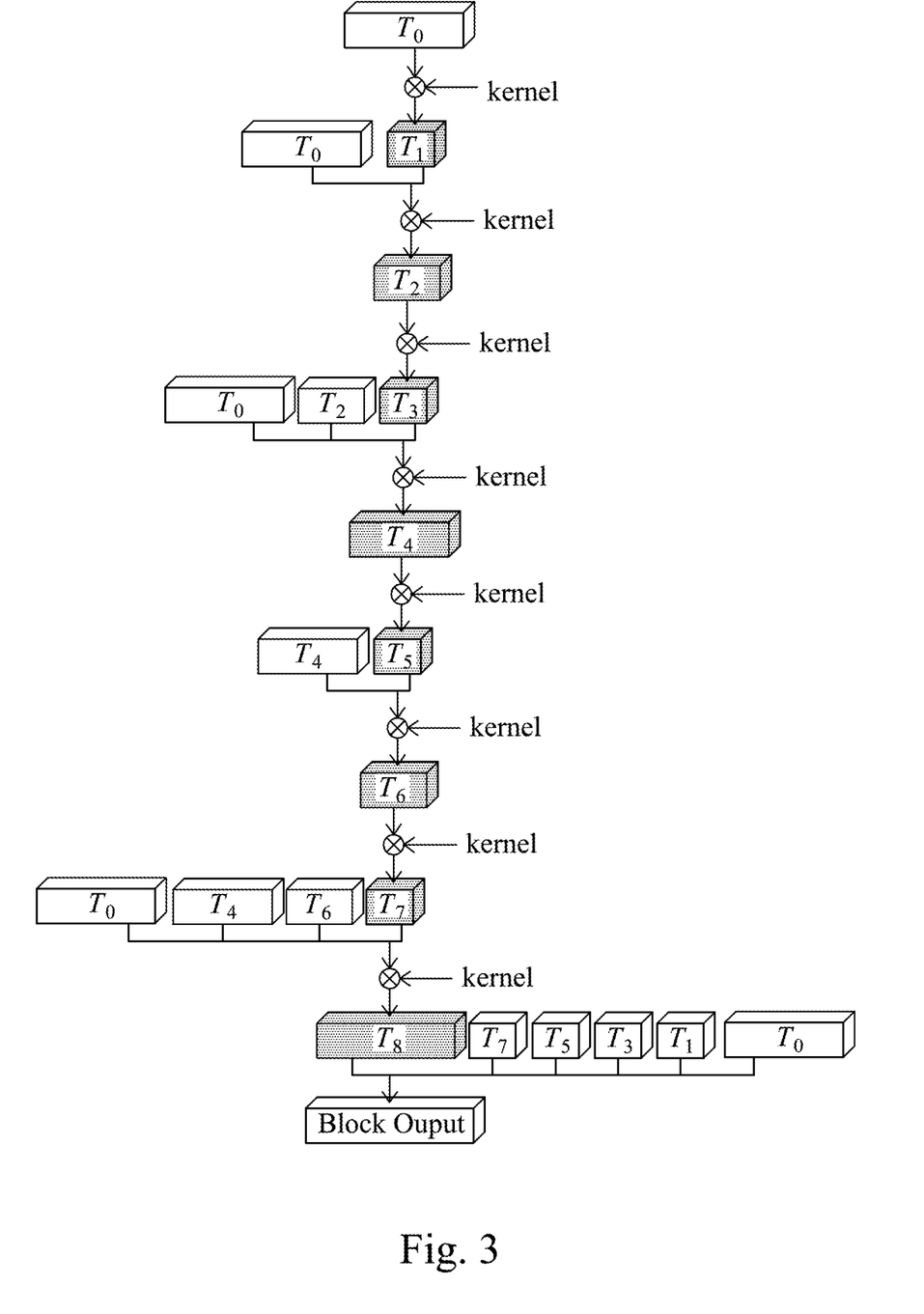
FIG. 3 shows a schematic diagram of another example of the harmonic densely connecting method of FIG. 1.

Please refer to FIG. 3, FIG. 3 shows a schematic diagram of another example of the harmonic densely connecting method s100 of FIG. 1. In FIG. 3, each of the layer operation steps s120 calculates the convolution operation on the layer-input tensor with the convolutional kernel so as to produce the at least one result tensor of each of the layer operation steps s120. The output step s130 of the harmonic densely connecting method s100 selects the set of at least one block output element tensor from the at least one result tensor and the original input tensor in the memory 220 according to an output connection rule. The output connection rule of the output step s130 is satisfied by a formula (5).

$$OS = \{T_q \,|\, q \mod 2 = 1 \text{ or } q = N \text{ or } q = 0\}. \quad (5)$$

The block output is selected from the at least one result tensor and the original input tensor in the memory 220 by the formula (5), and it denotes $OS = \{T_q | q \mod 2 = 1 \text{ or } q = N \text{ or } q = 0\} = \{T_0, T_1, T_3, T_5, T_7, T_8\}$. Therefore, the block output of the harmonic densely connecting method s100 of FIG. 3 includes $\{T_0, T_1, T_3, T_5, T_7, T_8\}$.

In order to optimize a memory access of the harmonic densely connecting method s100 so as to reduce a power consumption. A number of the at least one result tensor is greater than 1. When $T_l$ is calculated and l is divided by 4, at least one of the result tensors storing in the memory 220 is removed according to a removing rule. The removing rule is satisfied by a formula (6).

$$RS_l = \{T_r \,|\, T_r \in TS_l - \quad (6)$$

-continued
$$\{T_c \,|\, c = \min\{c \,|\, T_c \in TS_l\} - \{T_a \,|\, a = \max\{a \,|\, T_a \in TS_l\}\}\}\}.$$

Wherein $RS_l$ is a set of the at least one of the result tensors storing in the memory 220 which can be removed after a lth layer operation step. $T_r$ is one of the result tensors in the memory 220 which can be removed. $TS_l$ is the layer-input set of the lth layer operation step. $T_c$ is one of the layer-input element tensors of the lth layer operation step. $T_a$ is another one of the layer-input element tensors of the lth layer operation step. In other words, in the lth layer operation step, the harmonic densely connecting method s100 makes it possible to remove the set of the at least one of the result tensors storing in the memory 220 so as to increase an access efficiency of the memory 220. Therefore, the memory accesses can be reduced so as to decrease the power consumption.

Please refer to FIG. 2, FIG. 3 and Table 1. In the layer operation step 4, the layer-input set of the layer operation step 4 is selected from the at least one result tensor and the original input tensor in the memory 220 by the formula (1). It denotes $TS_l = TS_4 = \{T_{4-2^x} | 4 \mod 2^x = 0, 4 \geq 2^x, x \in \mathbb{Z}, x \geq 0\} = \{T_0, T_2, T_3\}$, and x is equal to $\{0, 1, 2\}$. Because a number of the at least one layer-input element tensor of the layer-input set of the layer operation step 4 is equal to 3, the layer-input tensor concatenating step of the layer operation step 4 concatenates $T_0, T_2, T_3$ to produce a layer-input tensor. The convolution operation step of the layer operation step 4 performs a convolution operation on the layer-input tensor with a convolutional kernel so as to produce $T_4$. Because $T_4$ is calculated, the set of the at least one of the result tensors storing in the memory 220 which is going to be removed according to the removing rule is $RS_4 = \{T_r | T_r \in TS_l - \{T_c | c = \min\{c | T_c \in TS_4\} - \{T_a | a = \max\{a | T_a \in TS_4\}\}\}\} = \{T_2\}$, and it denotes $T_c = T_0$, $T_a = T_3$ and $T_2$ is removed from the memory 220. Thus, after performing the layer operation step 4, there are only $T_0, T_1, T_3, T_4$ storing in the memory 220. Therefore, the access efficiency of the memory 220 and the power consumption is decreased.

In order to decrease the power consumption of the harmonic densely connecting method s100, m is greater than 1.4 and less than 2, and N is power of 2. However, m can be any positive number, and the present disclosure is not limited thereto.

Figure 4:
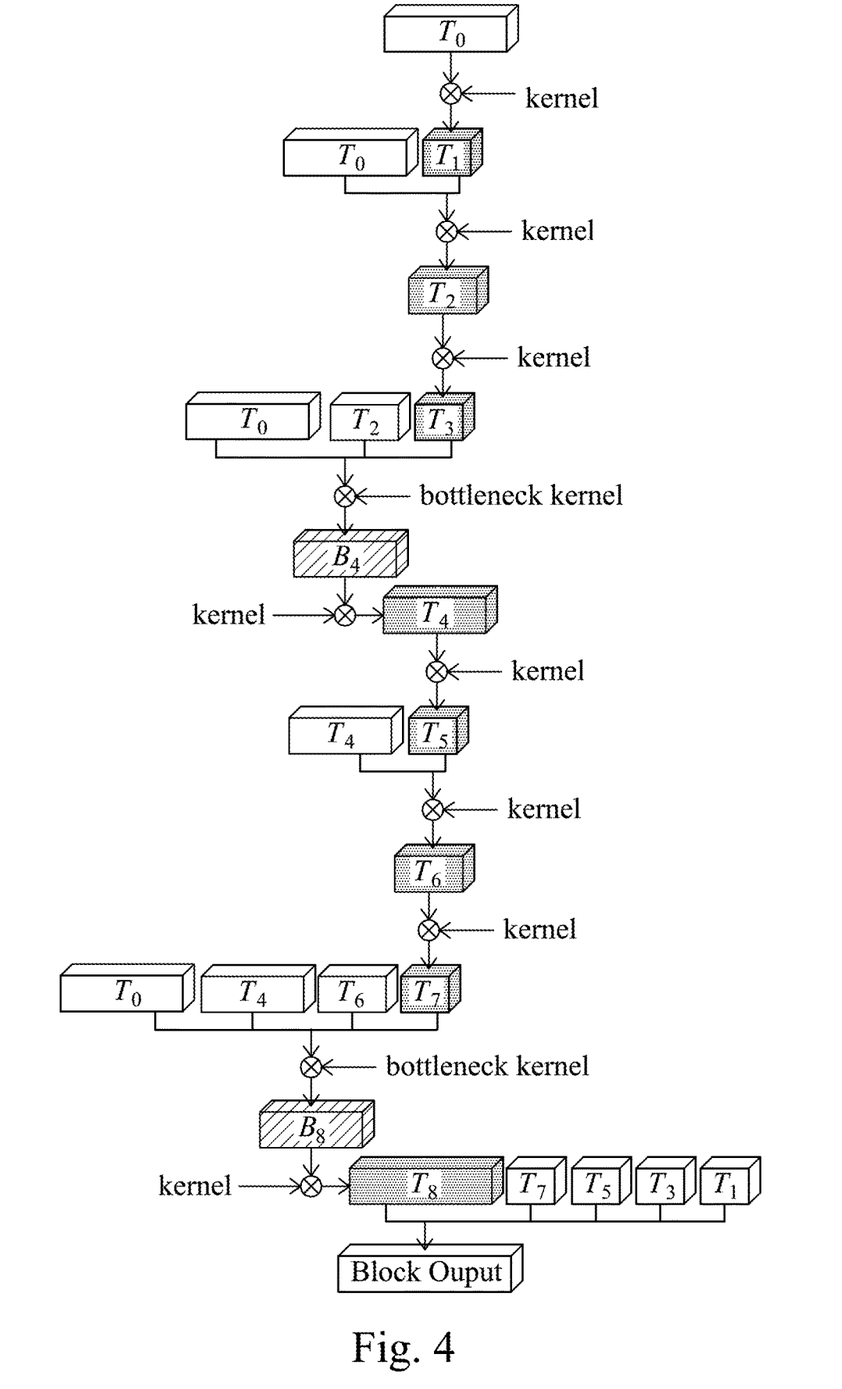
FIG. 4 shows a schematic diagram of further another example of the harmonic densely connecting method of FIG. 1.

Please refer to the FIG. 4, FIG. 4 shows a schematic diagram of further another example of the harmonic densely connecting method s100 of FIG. 1. In order to reduce the computation of the harmonic densely connecting method s100, a part of the layer operation steps s120 further includes a bottleneck layer step. The bottleneck layer step is for calculating the convolution operation on the layer-input tensor with a bottleneck kernel so as to produce a bottleneck tensor, and a size of the bottleneck kernel is 1×1. Each of the part of the layer operation steps s120 calculates the convolution operation on the bottleneck tensor with the convolutional kernel so as to produce the at least one result tensor. In other words, in each of the part of the layer operation steps s120, the bottleneck layer step performs the convolution operation on the layer-input tensor with the bottleneck kernel so as to produce the bottleneck tensor. Because the size of the bottleneck kernel is 1×1, a parameter size of bottleneck tensor can be reduced so as to a parameter efficiency of the harmonic densely connecting method s100 can be enhanced. Then, the convolution operation step calculates the at least one result tensor of each of the part of the layer operation steps s120 by a convolutional operation on the bottleneck tensor with the convolutional kernel. Therefore, the computation of the part of the layer operation steps s120 (e.g., the layer operation steps 4 and 8 in FIG. 4) can be reduced. Further, each of the other part of the layer operation steps s120 (e.g., the layer operation steps 1-3 and 5-7 in FIG. 4) calculates the convolution operation on the layer-input tensor with the convolutional kernel so as to produce the at least one result tensor.

In order to reduce the computation of the harmonic densely connecting method s100, a channel width of the bottleneck tensor is satisfied by a formula (7).

$$\text{Channel}(B_b) = \sqrt{\frac{\text{Channel}(TS_b)}{\text{Channel}(T_b)}} \times \text{Channel}(T_b). \quad (7)$$

Wherein $B_b$ is the bottleneck tensor of a bth layer operation step. Channel($B_b$) is the channel width of $B_b$. b is a layer index of the bth layer operation step. $TS_b$ is the layer-input set in the layer-input tensor concatenating step of the bth layer operation step. Channel($TS_b$) is the summation of the channel width of all layer-input element tensors of $TS_b$.

Because of the input connection rule, the channel width of the layer-input tensor of each of even layer operation steps s120, such as the layer operation step 2 and the layer operation step 4, is greater than the channel width of the layer-input tensor of each of odd layer operation steps s120, such as the layer operation step 1 and the layer operation step 3. Therefore, b can be an even positive integer so as to reduce the computation of the harmonic densely connecting method s100. In FIG. 4, b is satisfied by a formula (8).

$$b \bmod 4 = 0 \text{ and } b > 0. \quad (8)$$

Please refer to FIG. 4, in the layer operation step 7, the layer-input set of the layer operation step 7 is selected from the memory 220 by the input connection rule. It denotes $TS_j = TS_7 = \{T_{7-2^x} | 7 \bmod 2^x = 0, 7 \geq 2^x, x \in \mathbb{Z}, x \geq 0\} = \{T_6\}$, and x is equal to 0. Because a number of the at least one layer-input element tensor of the layer-input set of the layer operation step 7 is equal to 1, the layer-input tensor of the layer operation step 7 is $T_6$. Due to 7 mod 4≠0, the layer operation step 7 calculates the convolution operation on $T_6$ with the convolutional kernel of the layer operation step 7 so as to produce $T_7$.

Please refer to FIG. 4, in the layer operation step 8, the layer-input set is selected from the at least one result tensor and the original input tensor in the memory 220 by the formula (1). It denotes $TS_j = TS_8 = \{T_{8-2^x} | 8 \bmod 2^x = 0, 8 \geq 2^x, x \in \mathbb{Z}, x \geq 0\} = \{T_0, T_4, T_6, T_7\}$ and x is equal to {0, 1, 2, 3}. Because a number of the at least one layer-input element tensor of the layer-input set of the layer operation step 8 is equal to 4. The layer-input tensor concatenating step of the layer operation step 8 concatenates $T_0, T_4, T_6, T_7$ along the channel dimension, and produces the layer-input tensor of the layer operation step 8. The bottleneck layer step of the layer operation step 8 performs the convolution operation on the layer-input tensor with a bottleneck kernel for calculating the bottleneck tensor of the layer operation step 8. The channel width of the bottleneck tensor of the layer operation step 8 is $$\text{Channel}(B_8) = \sqrt{\frac{\text{Channel}(TS_8)}{\text{Channel}(T_8)}} \times \text{Channel}(T_8) = \sqrt{\frac{\text{Channel}(TS_8)}{k \times m^3}} \times k \times m^3,$$

and it denotes the channel width of the bottleneck tensor of the layer operation step 8 is less than the channel width of the layer-input tensor of the layer operation step 8, so that the computation of the layer operation step 8 can be reduced. After the bottleneck layer step of the layer operation step 8, the convolution operation step of the layer operation step 8 calculates a convolutional operation on $B_8$ and the convolutional kernel so as to produce $T_8$. Therefore, the computation of the harmonic densely connecting method s100 can be reduced and the parameter efficiency of the harmonic densely connecting method s100 can be enhanced.

Please refer to FIG. 5, FIG. 5 shows a block diagram of a system 200 of the harmonic densely connecting method s100 of the block of the convolutional neural network model of FIG. 1. The system 200 of the harmonic densely connecting method s100 of the block of the convolutional neural network model includes a Central Processing Unit (CPU) 210, the memory 220. The CPU 210 performs the layer operation steps s120. The memory 220 is electronically connected to the CPU 210 and stores the at least one result tensor and the original input tensor. In detail, the CPU 210 performs the layer-input tensor concatenating step and convolution operation step of each of the layer operation steps s120. In the layer-input tensor concatenating step, the CPU 210 selects at least one layer-input element tensor of the layer-input set of each of the layer operation steps s120 from at least one result tensor or the original input tensor in the memory 220 according to the input connection rule. Because of the input connection rule, the channel width of the layer-input tensor of each of the layer operation steps s120 is reduced. Therefore, the computation of the system 200 can be reduced.

In order to reduce the power consumption of the system 200, the CPU 210 removes at least one of the result tensors storing in the memory 220 according to the formula (6). Therefore, the access efficiency of the memory 220 can be increased, and the power consumption of the system 200 can be reduced.

Further, the CPU 210 performs the bottleneck layer step of the parts of the layer operation steps s120, so that the computation of the system 200 can be reduced.

Figure 6:
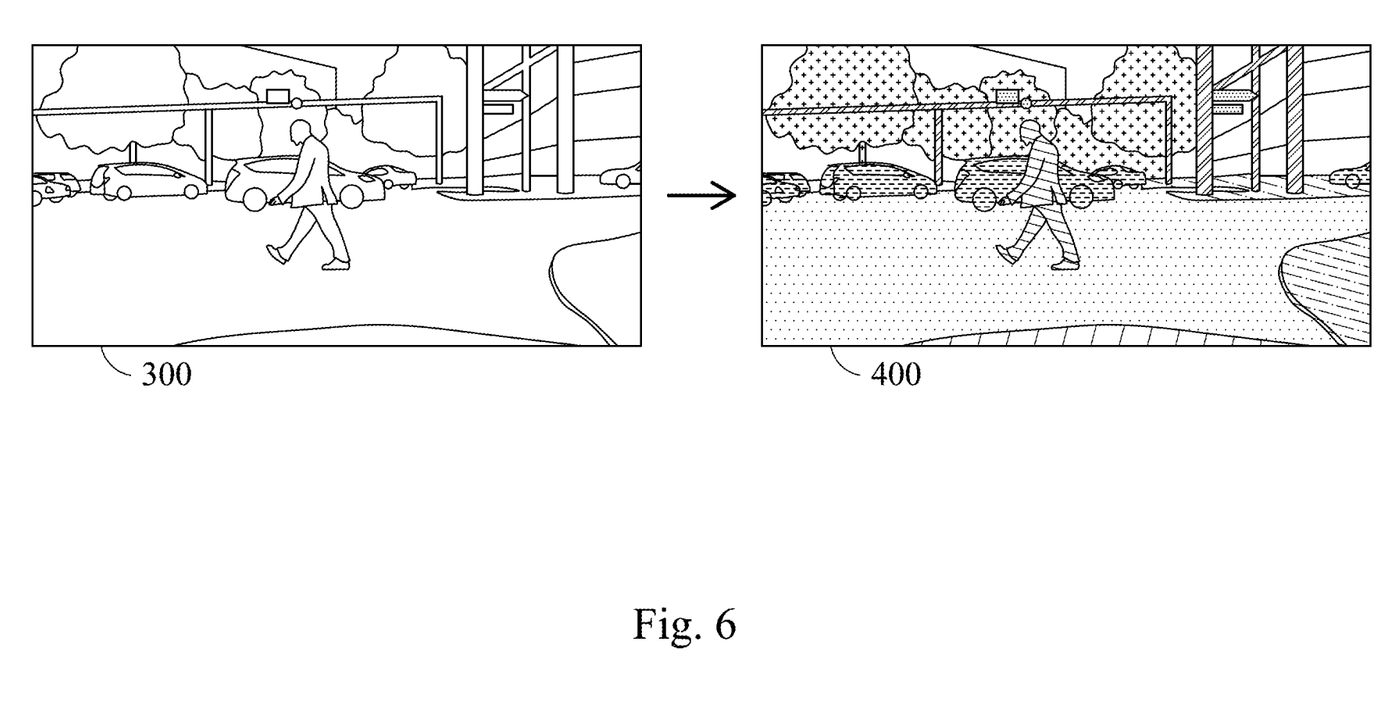
FIG. 6 shows a schematic diagram of an input image and an output image of the harmonic densely connecting method of FIG. 1, which is applied to a semantic segmentation.
Figure 7:
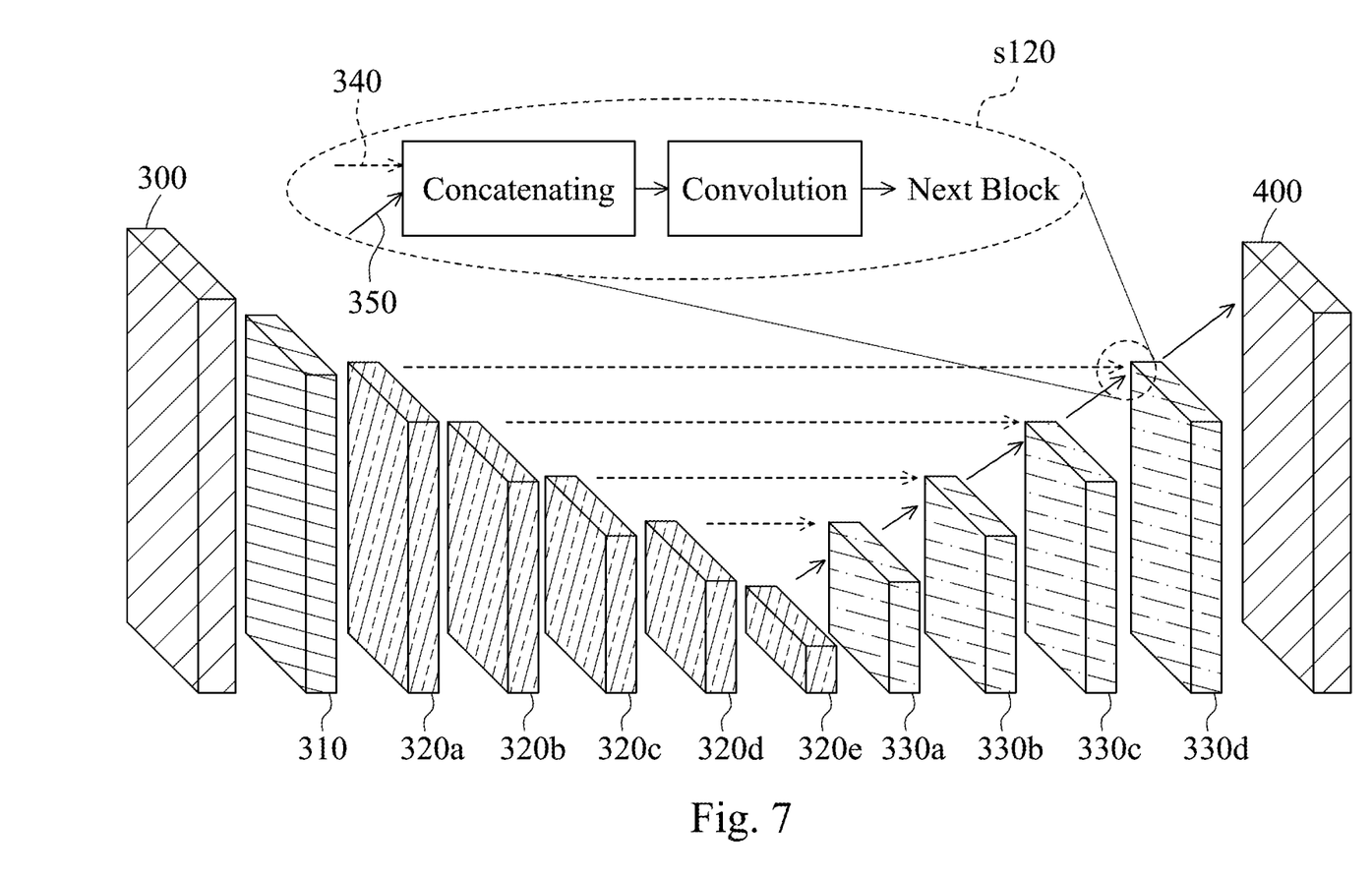
FIG. 7 shows a schematic diagram of FCHarDNet70 of the harmonic densely connecting method of FIG. 1.

Please refer to FIGS. 1, 5, 6 and 7. FIG. 6 shows a schematic diagram of an input image 300 and an output image 400 of the harmonic densely connecting method s100 of FIG. 1, which is applied to a semantic segmentation. FIG. 7 shows a schematic diagram of FCHarDNet70 of the harmonic densely connecting method s100 of FIG. 1. The harmonic densely connecting method s100 is applied to a semantic segmentation with a harmonic densely connected network (HarDNet) and includes an input step s110, a plurality of layer operation steps s120 and an output step s130. The input step s110 is performed by a CPU 210 to store an original input tensor of the block of the input image 300 of the semantic segmentation into a memory 220. Each of the layer operation steps s120 includes a layer-input tensor concatenating step and a convolution operation step. The layer-input tensor concatenating step is performed by the CPU 210 to select at least one layer-input element tensor of a layer-input set from at least one result tensor and the original input tensor in the memory 220 according to an input connection rule. When a number of the at least one layer-input element tensor of the layer-input set is greater than 1, concatenating all of the at least one layer-input element tensors along a channel dimension, and producing a layer-input tensor. The convolution operation step is performed by the CPU 210 to calculate a convolution operation on the layer-input tensor to produce the at least one result tensor, and then store the at least one result tensor into the memory 220. The output step s130 is performed by the CPU 210 to output a block output of the output image 400 of the semantic segmentation. The block output is a set of at least one block output element tensor, which is selected from the at least one result tensor and the original input tensor in the memory 220 according to an output connection rule. The semantic segmentation is configured to classify the block of the input image 300 into the block output of the output image 400, as shown in FIG. 6.

The at least one result tensor of each of the layer operation steps s120 is $T_i$. i is an integer which is larger than 0, and $T_0$ is the original input tensor. The input connection rule in the layer-input tensor concatenating step satisfies the formula (1). The at least one result tensor in the memory 220 has a channel width, and the channel width of the at least one result tensor satisfies the formula (2) and the formula (3).

In one embodiment, the harmonic densely connected network may be FCHarDNet70, as shown in FIG. 7, but the present disclosure is not limited thereto. In FIG. 7, an architecture of FCHarDNet70 includes the input image 300, a stem block 310, a plurality of harmonic densely block (HarDBlock) encoders 320a, 320b, 320c, 320d, 320e, a plurality of HarDBlock decoders 330a, 330b, 330c, 330d, a plurality of skip connections 340, a plurality of bilinear upsamplings 350 and the output image 400. The input image 300 is operated by four layer operation steps s120 to extract features as the stem block 310. The HarDBlock encoders 320a, 320b, 320c, 320d, 320e are corresponding to the strides 4, 8, 16, 32, 64, respectively. The HarDBlock decoders 330a, 330b, 330c, 330d are corresponding to the strides 32, 16, 8, 4, respectively. Each of the HarDBlock encoders 320a, 320b, 320c, 320d, 320e performs an average pooling to extract features. Each of The HarDBlock decoders 330a, 330b, 330c, 330d is performed to concatenate the same resolution image in the HarDBlock encoder (corresponding to the skip connections 340) and the bilinear upsampled tensor (corresponding to the bilinear upsamplings 350), and then calculate the convolution operation to generate the results for the next block. "Concatenating" represents the layer-input tensor concatenating step of each of the layer operation steps s120. "Convolution" represents the convolution operation step of each of the layer operation steps s120. Accordingly, the input image 300 can be inputted to FCHarDNet70 (Deep learning model) to generate the output image 400 so as to perform the semantic segmentation with improved performance and improved power efficiency.

It is understood that the harmonic densely connecting method s100 is performed by the aforementioned steps. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform the method based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EE-PROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A harmonic densely connecting method of a block of a convolutional neural network model, which is applied to a semantic segmentation, the harmonic densely connecting method of the block of the convolutional neural network model comprising:
    an input step, wherein the input step is performed by a Central Processing Unit (CPU) to store an original input tensor of the block of an input image of the semantic segmentation into a memory;
    a plurality of layer operation steps, wherein each of the layer operation steps comprises:
        a layer-input tensor concatenating step, wherein the layer-input tensor concatenating step is performed by the Central Processing Unit to select at least one layer-input element tensor of a layer-input set from at least one result tensor and the original input tensor in the memory according to an input connection rule, when a number of the at least one layer-input element tensor of the layer-input set is greater than 1, concatenating all of the layer-input element tensors along a channel dimension, and producing a layer-input tensor; and
        a convolution operation step, wherein the convolution operation step is performed by the Central Processing Unit to calculate a convolution operation on the layer-input tensor to produce the at least one result tensor, and then store the at least one result tensor into the memory; and
    an output step, wherein the output step is performed by the Central Processing Unit to output a block output of an output image of the semantic segmentation, the block output is a set of at least one block output element tensor, which is selected from the at least one result tensor and the original input tensor in the memory according to an output connection rule;
    wherein the semantic segmentation is configured to classify the block of the input image into the block output of the output image;
    wherein the at least one result tensor of each of the layer operation steps is $T_i$, i is an integer which is larger than 0, and $T_0$ is the original input tensor;
    wherein the input connection rule in the layer-input tensor concatenating step satisfies:

$$TS_j = \{T_{j-2^x} \mid j \bmod 2^x = 0, j \geq 2^x, x \in \mathbb{Z}, x \geq 0\};$$

wherein $TS_j$ is the layer-input set in the layer-input tensor concatenating step of a jth layer operation step, x is a non-negative integer, and $T_{j-2^x}$ is the at least one layer-input element tensor;

wherein the at least one result tensor in the memory has a channel width, and the channel width of the at least one result tensor satisfies:

$$\mathrm{Channel}(T_i) = k * m^{z_i};$$

and
wherein $\mathrm{Channel}(T_i)$ is the channel width of $T_i$, k is a constant, m is a constant, and $z_i$ is an integer and satisfies:

$$z_i = \max\{x \mid i \bmod 2^x = 0, x \in \mathbb{Z}, x \geq 0\}.$$

2. The harmonic densely connecting method of the block of the convolutional neural network model of claim 1, wherein the output connection rule of the output step satisfies:

$$OS = \{T_q \mid q \bmod 2 = 1 \text{ or } q = N\};$$

wherein OS is the block output, $T_q$ is the block output element tensor of the block output, q is an integer from 1 to N, N is a total number of the layer operation steps, and N is a positive integer.

3. The harmonic densely connecting method of the block of the convolutional neural network model of claim 1, wherein the output connection rule of the output step satisfies:

$$OS = \{T_q \mid q \bmod 2 = 1 \text{ or } q = N \text{ or } q = 0\};$$

wherein OS is the block output, $T_q$ is the block output element tensor of the block output, q is an integer from 0 to N, N is a total number of the layer operation steps, and N is a positive integer.

4. The harmonic densely connecting method of the block of the convolutional neural network model of claim 1, wherein each of the layer operation steps calculates the convolution operation on the layer-input tensor with the convolutional kernel so as to produce the at least one result tensor.

5. The harmonic densely connecting method of the block of the convolutional neural network model of claim 1, wherein m is greater than 1.4 and less than 2.

6. The harmonic densely connecting method of the block of the convolutional neural network model of claim 1, wherein N is a total number of the layer operation steps, and N is power of 2.

7. The harmonic densely connecting method of the block of the convolutional neural network model of claim 1, wherein a number of the at least one result tensor is greater than 1, when $T_l$ is calculated and l is divided by 4, at least one of the result tensors storing in the memory is removed according to a removing rule, the removing rule satisfies:

$$RS_l = \{T_r \mid T_r \in TS_l - \{T_c \mid c = \min\{c \mid T_c \in TS_l\} - \{T_a \mid a = \max\{a \mid T_a \in TS_l\}\}\}\};$$

wherein $RS_l$ is a removing set of the at least one of the result tensors in the memory which is removed after a lth layer operation step, $T_r$ is one of the result tensors in the memory which is removed, $TS_l$ is the layer-input set of the lth layer operation step, $T_c$ is one of the layer-input element tensors of the lth layer operation step, and $T_a$ is another one of the layer-input element tensors of the lth layer operation step.

8. The harmonic densely connecting method of the block of the convolutional neural network model of claim 1, wherein a part of the layer operation steps further comprises a bottleneck layer step, the bottleneck layer step is for calculating the convolution operation on the layer-input tensor with a bottleneck kernel so as to produce a bottleneck tensor, and a size of the bottleneck kernel is 1×1;
wherein each of the part of the layer operation steps calculates the convolution operation on the bottleneck tensor with the convolutional kernel so as to produce the at least one result tensor.

9. The harmonic densely connecting method of the block of the convolutional neural network model of claim 8, wherein each of the other part of the layer operation steps calculates the convolution operation on the layer-input tensor with the convolutional kernel so as to produce the at least one result tensor.

10. The harmonic densely connecting method of the block of the convolutional neural network model of claim 8, wherein a channel width of the bottleneck tensor satisfies:

$$\mathrm{Channel}(B_b) = \sqrt{\frac{\mathrm{Channel}(TS_b)}{\mathrm{Channel}(T_b)}} \times \mathrm{Channel}(T_b);$$

wherein $B_b$ is the bottleneck tensor of a bth layer operation step, $\mathrm{Channel}(B_b)$ is the channel width of $B_b$, $TS_b$ is the layer-input set in the layer-input tensor concatenating step of the bth layer operation step, and $\mathrm{Channel}(TS_b)$ is the summation of channel width of all layer-input element tensors of $TS_b$ element tensor.

11. The harmonic densely connecting method of the block of the convolutional neural network model of claim 10, wherein b is corresponding to b mod 4=0.

12. A system of a harmonic densely connecting method of a block of a convolutional neural network model, which is applied to semantic segmentation, the system comprising:
a Central Processing Unit (CPU) performs the harmonic densely connecting method; and
a memory electronically connected to the Central Processing Unit and storing at least one result tensor and an original input tensor;
wherein the harmonic densely connecting method comprises:
an input step, wherein the input step is performed by the Central Processing Unit to store the original input tensor of the block of an input image of the semantic segmentation into the memory;

a plurality of layer operation steps, wherein each of the layer operation steps comprises:
  a layer-input tensor concatenating step, wherein the layer-input tensor concatenating step is performed by the Central Processing Unit to select at least one layer-input element tensor of a layer-input set from the at least one result tensor and the original input tensor in the memory according to an input connection rule, when a number of the at least one layer-input element tensor of the layer-input set is greater than 1, concatenating all of the layer-input element tensors along a channel dimension, and producing a layer-input tensor; and
  a convolution operation step, wherein the convolution operation step is performed by the Central Processing Unit to calculate a convolution operation on the layer-input tensor to produce the at least one result tensor, and then store the at least one result tensor into the memory; and
an output step, wherein the output step is performed by the Central Processing Unit to output a block output of an output image of the semantic segmentation, the block output is a set of at least one block output element tensor, which is selected from the at least one result tensor and the original input tensor in the memory according to an output connection rule;
wherein the semantic segmentation is configured to classify the block of the input image into the block output of the output image;
wherein the at least one result tensor of each of the layer operation steps is $T_i$, i is an integer which is larger than 0, and $T_0$ is the original input tensor;
wherein the input connection rule in the layer-input tensor concatenating step satisfies:

$$TS_j = \{T_{j-2^x} \mid j \bmod 2^x = 0, j \geq 2^x, x \in \mathbb{Z}, x \geq 0\};$$

wherein $TS_j$ is the layer-input set in the layer-input tensor concatenating step of a jth layer operation step, x is a non-negative integer, and $T_{j-2^x}$ is the at least one layer-input element tensor;
wherein the at least one result tensor in the memory has a channel width, and the channel width of the at least one result tensor satisfies:

$$\text{Channel}(T_i) = k * m^{z_i};$$

and
  wherein $\text{Channel}(T_i)$ is the channel width of $T_i$, k is a constant, m is a constant, and $z_i$ is an integer and satisfies:

$$z_i = \max\{x \mid i \bmod 2^x = 0, x \in \mathbb{Z}, x \geq 0\}.$$

13. A non-transitory tangible computer readable recording medium storing instructions which when executed by a Central Processing Unit (CPU) configured to perform a harmonic densely connecting method of a block of a convolutional neural network model, the harmonic densely connecting method of the block of the convolutional neural network model comprising:

an input step, wherein the input step is performed by the Central Processing Unit to store an original input tensor of the block of an input image of the semantic segmentation into a memory;
a plurality of layer operation steps, wherein each of the layer operation steps comprises:
  a layer-input tensor concatenating step, wherein the layer-input tensor concatenating step is performed by the Central Processing Unit to select at least one layer-input element tensor of a layer-input set from at least one result tensor and the original input tensor in the memory according to an input connection rule, when a number of the at least one layer-input element tensor of the layer-input set is greater than 1, concatenating all of the layer-input element tensors along a channel dimension, and producing a layer-input tensor; and
  a convolution operation step, wherein the convolution operation step is performed by the Central Processing Unit to calculate a convolution operation on the layer-input tensor to produce the at least one result tensor, and then store the at least one result tensor into the memory; and
an output step, wherein the output step is performed by the Central Processing Unit to output a block output of an output image of the semantic segmentation, the block output is a set of at least one block output element tensor, which is selected from the at least one result tensor and the original input tensor in the memory according to an output connection rule;
wherein the semantic segmentation is configured to classify the block of the input image into the block output of the output image;
wherein the at least one result tensor of each of the layer operation steps is $T_i$, i is an integer which is larger than 0, and $T_0$ is the original input tensor;
wherein the input connection rule in the layer-input tensor concatenating step satisfies:

$$TS_j = \{T_{j-2^x} \mid j \bmod 2^x = 0, j \geq 2^x, x \in \mathbb{Z}, x \geq 0\};$$

wherein $TS_j$ is the layer-input set in the layer-input tensor concatenating step of a jth layer operation step, x is a non-negative integer, and $T_{j-2^x}$ is the at least one layer-input element tensor;
wherein the at least one result tensor in the memory has a channel width, and the channel width of the at least one result tensor satisfies:

$$\text{Channel}(T_i) = k * m^{z_i};$$

and
  wherein $\text{Channel}(T_i)$ is the channel width of $T_i$, k is a constant, m is a constant, and $z_i$ is an integer and satisfies:

$$z_i = \max\{x \mid i \bmod 2^x = 0, x \in \mathbb{Z}, x \geq 0\}.$$

* * * * *